US007563540B2

(12) United States Patent
Han et al.

(10) Patent No.: US 7,563,540 B2
(45) Date of Patent: Jul. 21, 2009

(54) CATHODE ACTIVE MATERIAL AND LITHIUM SECONDARY BATTERY USING THE SAME

(75) Inventors: Hyouk-soo Han, Seoul (KR); Young-min Choi, Osan-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 663 days.

(21) Appl. No.: 10/834,067

(22) Filed: Apr. 29, 2004

(65) Prior Publication Data
US 2005/0019661 A1 Jan. 27, 2005

(30) Foreign Application Priority Data
Jul. 24, 2003 (KR) ............. 10-2003-0051115

(51) Int. Cl.
H01M 4/58 (2006.01)
(52) U.S. Cl. .......... 429/231.3; 429/231.1; 429/231.2; 429/231.4; 429/231.8; 429/223; 252/521.2
(58) Field of Classification Search ........... 429/231.3, 429/231.1, 231.2, 231.4, 231.8, 223; 252/521.2
See application file for complete search history.

(56) References Cited

U.S. PATENT DOCUMENTS

| 5,344,726 A | 9/1994 | Tanaka et al. |
| 6,335,121 B1 | 1/2002 | Nakanishi et al. |
| 6,521,379 B2 | 2/2003 | Nishida et al. |

FOREIGN PATENT DOCUMENTS

| JP | 07-006753 | 1/1995 |
| JP | 07-320785 | 12/1995 |
| JP | 2000-294240 | * 10/2000 |
| JP | 2001-176511 | 6/2001 |
| JP | 2001-283851 | 10/2001 |

(Continued)

OTHER PUBLICATIONS

Song et al. "In situ visible Raman spectroscopic study of phase change in LiCoO2 film by laser irradiation"; Chemical Physics Letters 344, pp. 299-304, Aug. 24, 2001.*

(Continued)

Primary Examiner—Laura S Weiner
(74) Attorney, Agent, or Firm—Stein McEwen, LLP

(57) ABSTRACT

A cathode active material of formula (1) below, and a lithium secondary battery using the same, have an extended cycle life and effective charging/discharging characteristics and include a compound of formula (1) below:

$$Li_xCo_yM_{1-y}A_2 \quad (1)$$

where $0.95 \leq x \leq 1.0$; $0 \leq y \leq 1$; M is at least one selected from the group consisting of Ni, Fe, Pb, Mg, Al, K, Na, Ca, Si, Ti, Sn, V, Ge, Ga, B, As, Zr, Mn, and Cr; and A is one selected from the group consisting of O, F, S, and P. The cathode active material has, as measured by Raman spectroscopy, a ratio of peak intensities between spinel and hexagonal $A_{1g}$ vibrational modes in an approximate range of 1:0.1-1:0.4, a ratio of peak intensities between hexagonal $A_{1g}$ and $E_g$ vibrational modes in an approximate range of 1:0.9-1:3.5, and a ratio of peak intensities between spinel $A_{1g}$ and $F_{2g}$ vibrational modes in an approximate range of 1:0.2-1:0.4.

8 Claims, 3 Drawing Sheets

FOREIGN PATENT DOCUMENTS

JP    2002-279985    9/2002

OTHER PUBLICATIONS

Itoh et al. "In situ Raman spectroscopic study of LixCoO2 electrodes in propylene carbonate solvent systems", Journal of Power Sources (1997), 68 (2), pp. 333-337.*

Santiago et al. "Structural and electrochemical properties of LiCoO2 prepared by combustion synthesis", Solid State Ionics (2003), 158 (1, 2), pp. 81-102.*

Japanese Office Action dated Oct. 4, 2005.

Japanese Office Action dated Apr. 14, 2006 in corresponding Japanese Application No. 200410007458.

Office Action issued in Japanese Patent Application No. 2004-187955 on Jan. 30, 2007.

Office Action issued by Japanese Patent Office in Japanese Patent Application No. 2007-12489 on Sep. 16, 2008.

* cited by examiner

CATHODE ACTIVE MATERIAL AND LITHIUM SECONDARY BATTERY USING THE SAME

CROSS-REFERENCE TO RELATED APPLICATIONS

This application claims the priority of Korean Patent Application No. 2003-51115, filed on Jul. 24, 2003, in the Korean Intellectual Property Office, the disclosure of which is incorporated herein in its entirety by reference.

BACKGROUND OF THE INVENTION

1. Field of the Invention

The present invention relates to a lithium oxide cathode active material for use in a lithium secondary battery and a lithium secondary battery using the cathode active material, and more particularly, to a lithium oxide cathode active material that has particular relative peak intensities in its Raman spectrum and a lithium secondary battery using the same.

2. Description of the Related Art

With the recent rapid advancements in the manufacturing of portable, cordless appliances, lithium secondary batteries have become viable power sources for smaller electronic devices, such as laptop computers, mobile phones, camcorders, and the like. Since lithium cobalt oxide ($LiCoO_2$) was found to be an effective cathode active material, intensive research has been conducted into lithium complex oxides.

Regarding the development of secondary batteries, the cycle life, charging/discharging characteristic, and capacity characteristic are considered important performance measures. The composition and structure of cathode and anode active materials, an electrolyte, a binder, and the like, which constitute a secondary battery, are the main factors that affect the characteristics of the secondary battery.

A battery having desired characteristics may be manufactured by evaluating the factors that affect the performance of batteries. As disclosed in U.S. Pat. Nos. 5,344,726, 6,335,121, and the like, methods of evaluating the characteristics of batteries that depend on anode active materials in the manufacture of batteries include an X-ray technique and Raman spectroscopy by which peaks of carbonaceous anode active materials are read.

However, methods of evaluating characteristics of batteries that depend on cathode active materials based on Raman spectroscopy have been scarcely reported because a cathode active material is used generally as a mixture with a binder, a conductive carbon, and the like, in manufacturing a cathode and is difficult to be isolated from the other materials for analysis.

Therefore, conventionally, performance evaluation, for example, on the cycle life, charging/discharging characteristic, and capacity characteristic, has been carried out directly using complete batteries, not using cathode active materials. Obviously, X-ray diffraction analysis is often used to predict a cell performance in the step of developing active materials. However, a minor structural change of cathode active materials cannot be observed with this analysis method. There is no alternative but to evaluate the life span and safety measures using a complete battery when a particular cathode active material is used in the battery, thus increasing manufacturing time and costs in the development of cathode active materials batteries.

SUMMARY OF THE INVENTION

The present invention provides a cathode active material which allows the cycle life and charging/discharging characteristic to be predicted using a battery assembly, not a complete battery, through analysis on a structural change of the cathode active material using Raman spectroscopy, so that reliable batteries may be manufactured. The present invention also provides a lithium secondary battery using the cathode active material.

In one aspect, the present invention provides a cathode active material of formula (1) below:

$$Li_xCo_yM_{1-y}A_2 \qquad (1)$$

where $0.95 \leq x \leq 1.0$; $0 \leq y \leq 1$; M is at least one selected from the group consisting of Ni, Fe, Pb, Mg, Al, K, Na, Ca, Si, Ti, Sn, V, Ge, Ga, B, As, Zr, Mn, and Cr; and A is one selected from the group consisting of O, F, S, and P, wherein the cathode active material of formula (1) has, as measured by Raman spectroscopy, a ratio of peak intensities between spinel and hexagonal $A_{1g}$ vibrational modes in an approximate range of 1:0.1-1:0.4, a ratio of peak intensities between hexagonal $A_{1g}$ and $E_g$ vibrational modes in an approximate range of 1:0.9-1:3.5, and a ratio of peak intensities between spinel $A_{1g}$ and $F_{2g}$ vibrational modes in an approximate range of 1:0.2-1:0.4.

In another aspect, the present invention provides a lithium secondary battery comprising: an anode containing a carbonaceous material as a major component; a cathode containing the lithium-based compound of formula (1) above as a cathode active material; a separator interposed between the anode and the cathode; and one of a liquid electrolyte and a polymer electrolyte. As described above, the lithium-based compound of formula (1), which is used as the cathode active material, has, as measured by Raman spectroscopy, a ratio of peak intensities between spinel and hexagonal $A_{1g}$ vibrational modes in an approximate range of 1:0.1-1:0.4, a ratio of peak intensities between hexagonal $A_{1g}$ and $E_g$ vibrational modes in an approximate range of 1:0.9-1:3.5, and a ratio of peak intensities between spinel $A_{1g}$ and $F_{2g}$ vibrational modes in an approximate range of 1:0.2-1:0.4.

When the above lithium compound is used as a cathode active material, the cycle life, charging/discharging characteristic, and capacity characteristic of a battery may be predicted before the completion of manufacturing the battery. Therefore, batteries having desired characteristics may be manufactured more efficiently using the lithium-based cathode active material according to an embodiment of the present invention.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
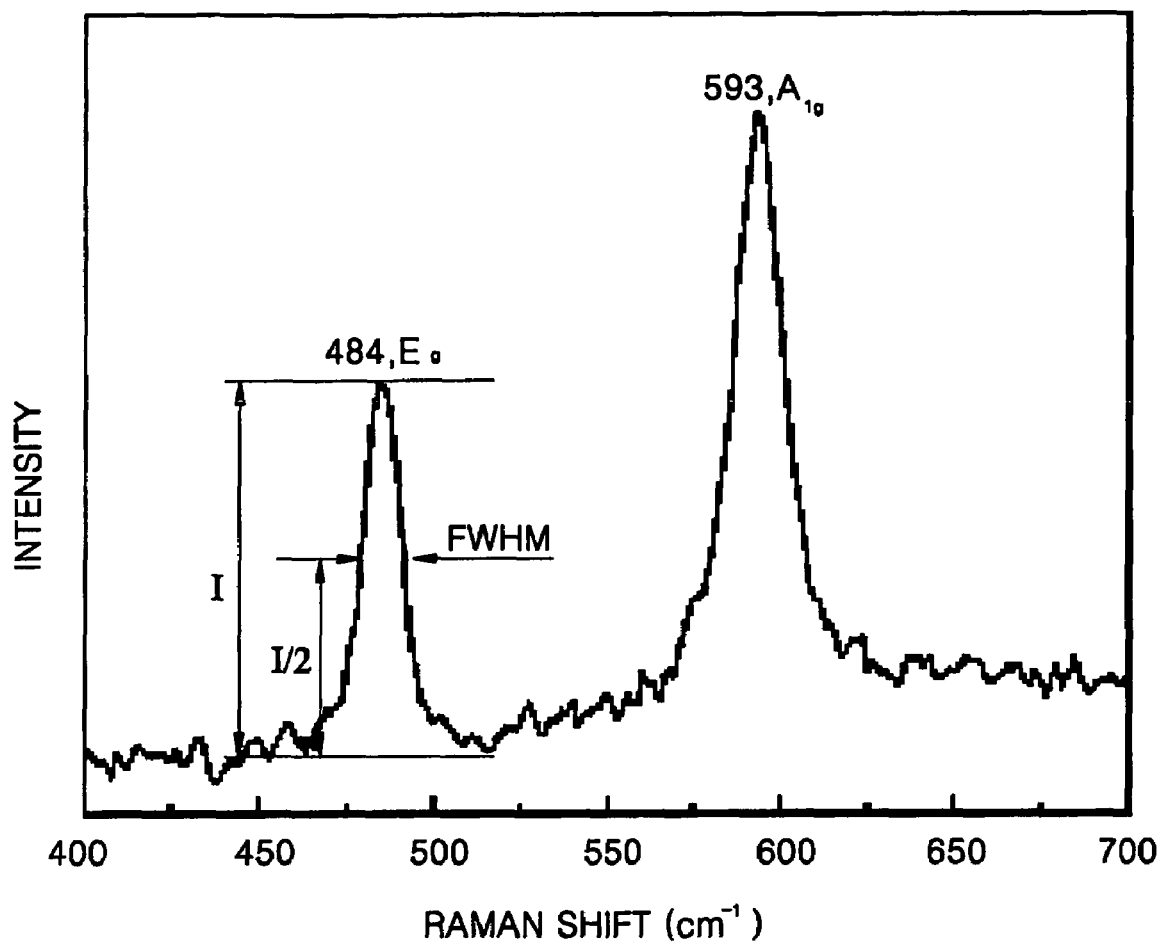
FIG. 1 is a Raman spectrum of a lithium cobalt oxide by itself before being used as a cathode active material in a battery in accordance with an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

A cathode active material and a nonaqueous lithium secondary battery using the same according to an embodiment of the present invention will be described in detail with reference to the appended drawings.

Lithium secondary batteries are manufactured by forming an electrode assembly from a cathode and an anode, which are made of materials capable of reversible intercalation and deintercalation of lithium ions, and a separator interposed between the cathode and the anode and incorporating a liquid electrolyte or a polymer electrolyte into the electrode assembly. In principle, lithium secondary batteries generate electrical energy by oxidation and reduction that take place when lithium ions are intercalated into and deintercalated from their cathode and anode. The cycle life, the charging/discharging characteristic, and the capacity characteristic of the lithium secondary battery vary depending on a microstructural change of a cathode active material used therein.

According to the present invention, a lithium-based compound of formula (1) below is used as a cathode active material.

$$Li_xCo_yM_{1-y}A_2 \quad (1)$$

where $0.95 \leq x \leq 1.0$; $0 \leq y \leq 1$; M is at least one selected from the group consisting of Ni, Fe, Pb, Mg, Al, K, Na, Ca, Si, Ti, Sn, V, Ge, Ga, B, As, Zr, Mn, and Cr; and A is one selected from the group consisting of O, F, S, and R The lithium-based cathode active material of formula (1) originally has only a hexagonal structure but has hexagonal and spinel structures after being processed in the manufacture of a battery. The charging/discharging characteristic and cycle life of the battery greatly vary depending on a ratio of the above two structures. Such a minute structural change cannot be detected using X-ray diffraction and may be detected only using Raman spectroscopy.

Raman spectroscopy provides information on the molecular structure of a material from its vibrational mode and provides precise measurements of the minute and local changes of a molecular structure. When a sample is irradiated with light of a particular wavelength, inelastic Raman scattering occurs, and a signal that varies depending on the molecular structure of the sample is generated. Such Raman spectroscopy may be applied to analyze the molecular structures of cathode active materials. Various Raman spectrum peaks appear depending on the molecular structures of cathode active materials, so that lithium-based cathode active materials that are suitable for yielding desired battery characteristics may be distinguished.

In particular, the full-width at half-maximum (FWHM), relative peak intensities, and peak positions of $A_{1g}$, $E_g$, and $F_{2g}$ vibrational modes of lithium-based compounds vary with the molecular structures of the cathode active materials. Based on these variations, a desired cathode active material may be screened.

Figure 2:
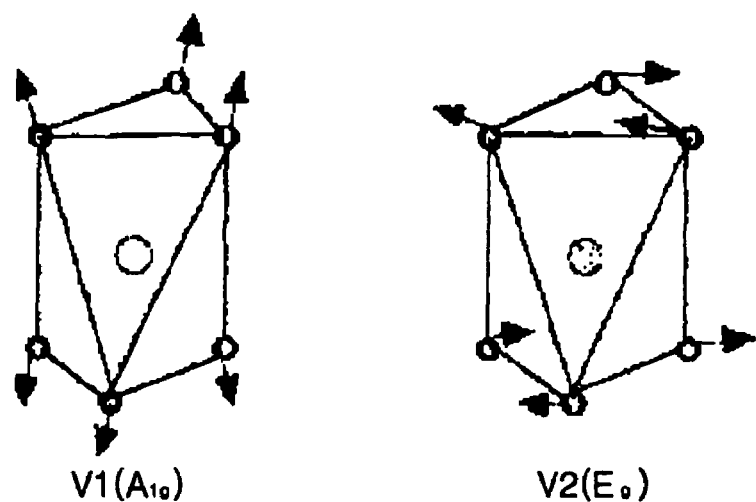
FIG. 2 illustrates the hexagonal $A_{1g}$ and $E_g$ molecular vibrational modes of the lithium cobalt oxide before being used as a cathode active material in a battery according to an embodiment of the present invention.

The Raman spectrum of the lithium-based cathode active material, according to an embodiment of the present invention, contains two peaks corresponding to two vibrational modes, as shown in FIG. 1, before being processed, for example, in the manufacture of a battery. In other words, distinct peaks corresponding to two vibrational modes, i.e., $A_{1g}$ and $E_g$ modes, as illustrated in FIG. 2, appear.

However, after being processed in the manufacture of a battery, the lithium-based cathode active material, according to an embodiment of the present invention, has both hexagonal and spinel structures. To perform Raman spectroscopy of the lithium-based cathode active material after the active material is processed in the manufacture of an embodiment of the battery, the cathode plate is separated from the battery and heated at 400-650° C. for 1-10 minutes, thus generating the cathode active material and carbonaceous materials. The left cathode active material and carbonaceous materials are used as a sample in Raman spectroscopy. The characteristics of batteries are determined by the structure of a cathode active material incorporated thereinto, rather than by the original structure of a raw cathode active material before being used therein. Accordingly, it is also important to separate the lithium-based cathode active material from the cathode plate after the manufacture of the battery. A battery having an effective charging/discharging characteristic and cycle life characteristics may be manufactured by analyzing relative peak intensities and FWHMs for the two structures of the compound used in the battery.

In Raman spectroscopy, a 514-nm laser beam may be used as an excitation source. The Raman spectrum of the lithium-based compound contains peaks corresponding to $A_{1g}$ (hexagonal and spinel structures), $E_g$ (hexagonal structure), and $F_{2g}$ (spinel structure) vibrational modes and is analyzed by fitting to the Lorentzian function.

In the Raman spectrum of the lithium-based cathode active material of formula (1), a ratio of peak intensities between the spinel and hexagonal $A_{1g}$ vibrational modes is in an approximate range of 1:0.1-1:0.4, a ratio of peak intensities between the hexagonal $A_{1g}$ and $E_g$ vibrational modes is in an approximate range of 1:0.9-1:3.5, and a ratio of peak intensities between the spinel $A_{1g}$ and $F_{2g}$ vibrational modes is in an approximate range of 1:0.2-1:0.4.

Alternatively, the lithium-based cathode active compound of formula (1) may contain 10-1000 ppm of nickel, which improves the characteristics of the battery.

The hexagonal $A_{1g}$ and $E_g$ vibrational modes of the lithium-based compound may have FWHM values of approximately 12.8-13.6 and approximately 9.3-11.3, respectively, while having the above ratio of peak intensities. The spinel $A_{1g}$ and $F_{2g}$ vibrational modes of the lithium-based compound may have FWHM values of approximately 12.2-13.0 and approximately 14.1-16.6, respectively, while having the above ratio of peak intensities.

The present invention also provides a lithium secondary battery comprising: an anode that includes a carbonaceous material as a major component; a cathode that includes the lithium-based compound of formula (1) above as a cathode active material; a separator interposed between the anode and the cathode; and one of a liquid electrolyte and a polymer electrolyte. Regarding the lithium-based compound of formula (1) used as the cathode active material, as measured by Raman spectroscopy, a ratio of peak intensities between spinel and hexagonal $A_{1g}$ vibrational modes is in an approximate range of 1:0.1-1:0.4, a ratio of peak intensities between hexagonal $A_{1g}$ and $E_g$ vibrational modes is in an approximate range of 1:0.9-1:3.5, and a ratio of peak intensities between spinel $A_{1g}$ and $F_{2g}$ vibrational modes is in an approximate range of 1:0.2-1:0.4. The lithium secondary battery has an effective charging/discharging characteristic and advantageous cycle life characteristics.

The present invention will be described in greater detail with reference to the following examples. The following examples are for illustrative purposes and are not intended to limit the scope of the invention.

PREPARATION EXAMPLE 1

Preparation of Lithium Cathode Active Material 48 g of $CO_3O_4$ and 23 g of $Li_2CO_3$ including Ni impurities were weighed and mixed together. This mixture was calcinated at 800° C. The calcinated product was ground and was determined to provide a lithium cobalt oxide compound (Sample 1). The lithium cobalt oxide compound contained 159 ppm of Ni.

PREPARATION EXAMPLES 2 AND 3

Lithium cobalt oxide compounds including 24 ppm (Sample 2) and 623 ppm (Sample 3) of Ni, respectively, were synthesized in the same manner as in Preparation Example 1.

EXAMPLES 1 THROUGH 3

Manufacture of Lithium Secondary Batteries

Three mixtures were prepared by mixing 100 g of the lithium cobalt oxide compounds prepared in Preparation Examples 1 through 3, respectively, 5 g of polyvinylidene fluoride acting as a binder, 10 g of carbon black acting as a conducting agent, and 100 g of N-methyl-2-pyrrolidone. The mixtures were separately ground using ball milling for about 10 hours to provide cathode materials. The cathode materials were separately coated onto aluminum foils having a thickness of 15 μm and a width of 30 cm using 250 μm-gap doctor blades. The aluminum foils coated with the cathode materials were dried, press-rolled, and cut to a predetermined size to manufacture cathode plates.

100 g of crystalline artificial graphite (MIMB2528, available from OSAKA GAS, Japan) acting as an anode active material, 15 g of polyvinylidene fluoride acting as a binder, and 200 g of N-methyl-2-pyrrolidone were mixed together and ball-milled for about 10 hours to provide an anode active material composition.

The anode active material composition was coated onto copper foils having a thickness of 12 μm and a width of 30 cm using 300 μm-gap doctor blades. The copper foils coated with the anode active material composition were dried, press-rolled, and cut to a predetermined size to form anode plates.

Polyethylene separators having a thickness of 20 μm (available from CELGARD, U.S.A.) were interposed between the cathode plates and the anode plates, respectively, and sealed to form battery assemblies. A mixture of ethylene carbonate (EC), ethylmethyl carbonate (EMC), propylene carbonate (PC), fluorobenzene (FB) in a volumetric ratio of 30:55:5:10 that contained 1.1 M $LiPF_6$ was injected into each of the battery assemblies to provide complete lithium secondary batteries.

COMPARATIVE EXAMPLE

A lithium secondary battery was manufactured in the same manner as in Example 1, except that the cathode active material used contained less than 10 ppm of Ni.

EXPERIMENTAL EXAMPLE 1

Raman Spectroscopic Measurement

After performing charging and discharging once on the lithium secondary batteries prepared in Examples 1 through 3, the cathode plates were separated from the lithium secondary batteries and heated at 650° C. for 10 minutes to generate cathode active materials and carbonaceous materials. The cathode active materials and carbonaceous materials from the lithium secondary batteries were used as samples in Raman Spectroscopic measurements.

Raman spectroscopic measurements were carried out using a Raman spectrometer (System 3000, available from RENISHAW). A laser of 514 nm was used as an excitation source in measuring Raman spectra.

Peaks corresponding to the $A_{1g}$, $E_g$, and $F_{2g}$ vibrational modes of lithium cobalt oxide compounds in the Raman spectra were analyzed by fitting to the Lorentzian function.

Figure 3:
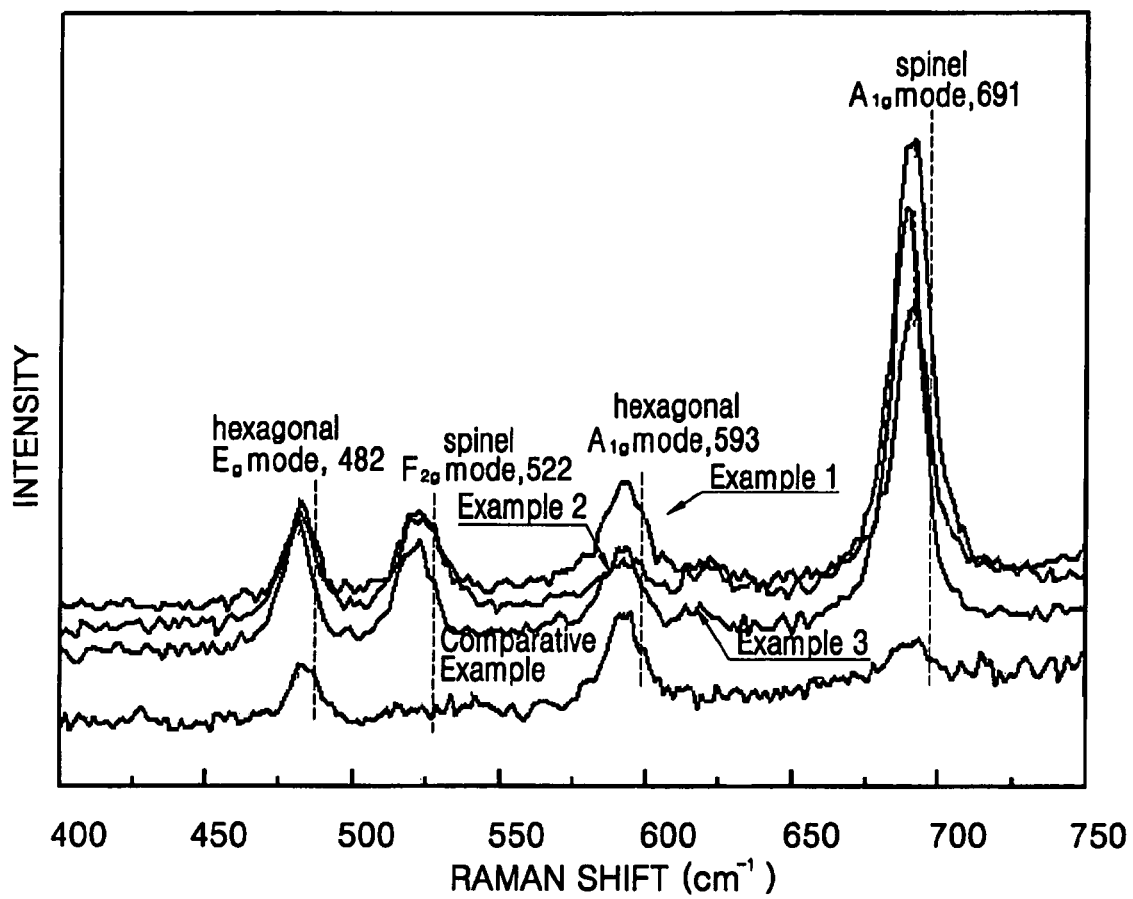
FIG. 3 is a Raman spectrum of a sample of a lithium cobalt oxide after being used as an cathode active material in the manufacture of a battery in accordance with an embodiment of the present invention.

The analyzed results are shown in Table 1 and FIG. 3.

TABLE 1

| Example | Structure | Vibrational Mode | Peak Position | I(Hexagoanl($E_g$/$A_{1g}$)) | I(Spinel($F_{2g}$/$A_{1g}$)) | I(Hexagoanl($A_{1g}$)/Spinel($A_{1g}$)) | FWHM |
|---|---|---|---|---|---|---|---|
| Example 1 | Hexagonal | $E_g$ | 482 | 0.93-1.02 | 0.27-0.29 | 0.34-0.38 | 9.6-10.7 |
|  |  | $A_{1g}$ | 592 |  |  |  | 12.8-13.6 |
|  | Spinel | $F_{2g}$ | 522 |  |  |  | 14.1-16.6 |
|  |  | $A_{1g}$ | 690 |  |  |  | 12.2-13.0 |
| Example 2 | Hexagonal | $E_g$ | 482 | 2.07-3.49 | 0.23-0.37 | 0.06-0.14 | 11.4-13.3 |
|  |  | $A_{1g}$ | 593 |  |  |  | 18.3-19.4 |
|  | Spinel | $F_{2g}$ | 523 |  |  |  | 14.4-23.4 |
|  |  | $A_{1g}$ | 690 |  |  |  | 13.8-14.4 |
| Example 3 | Hexagonal | $E_g$ | 481 | 1.48-1.57 | 0.24 | 0.18-0.21 | 9.3-11.3 |
|  |  | $A_{1g}$ | 592 |  |  |  | 13.0-13.1 |
|  | Spinel | $F_{2g}$ | 521 |  |  |  | 13.3-16.4 |
|  |  | $A_{1g}$ | 689 |  |  |  | 11.5-11.8 |

TABLE 1-continued

| Example | Structure | Vibrational Mode | Peak Position | I(Hexagoanl($E_g$/$A_{1g}$)) | I(Spinel($F_{2g}$/$A_{1g}$)) | I(Hexagoanl($A_{1g}$)/Spinel($A_{1g}$)) | FWHM |
|---|---|---|---|---|---|---|---|
| Comparative Example | Hexagonal | $E_g$ | 483 | 0.45-0.61 | N/A | 2.5-2.6 | 9.4-10.0 |
| | | $A_{1g}$ | 592 | | | | N/A |
| | Spinel | $F_{2g}$ | N/A | | | | 13.2-14.3 |
| | | $A_{1g}$ | 690 | | | | 13.3-15.1 |

As is apparent from Table 1 and FIG. 3, the lithium cobalt oxide compounds according to embodiments of the present invention, which are used as cathode active materials, have a spinel structure as well as a hexagonal structure and show specific Raman peaks having particular widths and ratios of intensities.

EXPERIMENTAL EXAMPLE 2

Cycle Life Test

The cylindrical lithium secondary batteries manufactured in Examples 1 through 3 and Comparative Example, which had a nominal capacity of 1800 mAh, were charged at a constant current of 1800 mA to a voltage of 4.2 V, left for 30 minutes, and discharged at a constant current of 1800 mA to a voltage of 2.75 V. This cycle of charging and discharging was repeated to measure the charging/discharging cycle life characteristics. The results are shown in FIG. 4.

Figure 4:
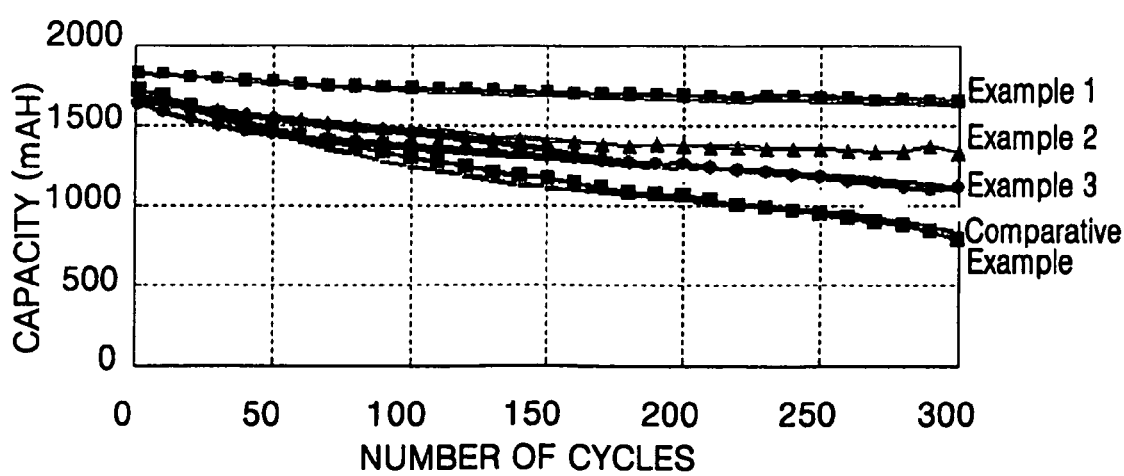
FIG. 4 is a graph of capacity versus number of charging/discharging cycles, for batteries manufactured using lithium cobalt oxides as cathode active materials in the examples of the present invention.

As is apparent from FIG. 4, the lithium secondary batteries manufactured using the cathode active materials according to an embodiment of the present invention show no great change in charging/discharging capacity even after 300 cycles, whereas a great drop in charging/discharging capacity occurs in the lithium secondary battery manufactured in Comparative Example after 300 cycles.

As is described above, a cathode active material of formula (1) above, and a lithium secondary battery using the cathode active material according to an embodiment of the present invention, have improved cycle life and charging/discharging characteristics and a greater discharging capacity. A performance of the lithium secondary battery may be measured using the cathode active material contained therein before a complete battery is manufactured, so that the time and costs required to develop electrode active materials and batteries may be markedly saved.

Figure 5:
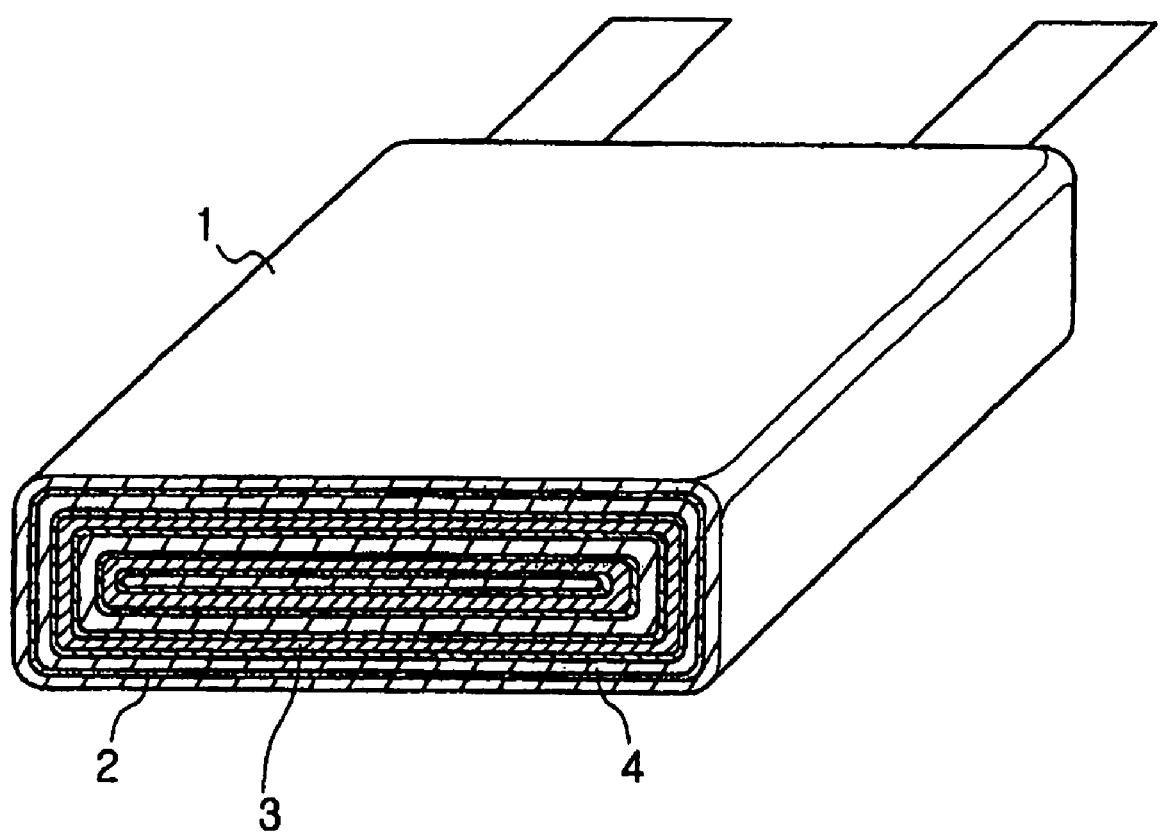
FIG. 5 is a perspective view showing a lithium secondary battery in accordance with an embodiment of the present invention.

In one embodiment, as shown in FIG. 5, an embodiment of the structure of a lithium secondary battery 1 in accordance with the present invention may include a positive electrode 3, a negative electrode 4, and a separator 2 interposed between the positive electrode 3 and the negative electrode 4, wherein the positive electrode 3, the negative electrode 4 and the separator 2 are wound together and are inserted into a battery case.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A cathode active material of formula (1) below:

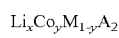    (1)

where $0.95 \leq x \leq 1.0$; $0 \leq y \leq 1$; M is at least one selected from the group consisting of Ni, Fe, Pb, Mg, Al, K, Na, Ca, Si, Ti, Sn, V, Ge, Ga, B, As, Zr, Mn, and Cr; and A is one selected from the group consisting of O, F, S, and P, the cathode active material of said formula (1) having, as measured by Raman spectroscopy, a ratio of peak intensities between spinel and hexagonal $A_{1g}$ vibrational modes in an approximate range of 1:0.1-1:0.4, a ratio of peak intensities between hexagonal $A_{1g}$ and $E_g$ vibrational modes in an approximate range of 1:0.9-1:3.5, and a ratio of peak intensities between spinel $A_{1g}$ and $F_{2g}$ vibrational modes in an approximate range of 1:0.2-1:0.4.

2. The cathode active material of claim 1, comprising nickel in an amount of 10-1000 ppm.

3. The cathode active material of claim 1, wherein, as measured by Raman spectroscopy, the hexagonal $A_{1g}$ and $E_g$ vibrational modes of the cathode active material of said formula (1) have full-width at half-maximum (FWHM) values of approximately 12.8-13.6 and approximately 9.3-11.3, respectively.

4. The cathode active material of claim 1, wherein, as measured by Raman spectroscopy, the spinel $A_{1g}$ and $F_{2g}$ vibrational modes of the cathode active material of said formula (1) have full-width at half-maximum (FWHM) values of approximately 12.2-13.0 and approximately 14.1-16.6, respectively.

5. A lithium secondary battery comprising:
   an anode comprising a carbonaceous material as a major component;
   a cathode comprising a lithium-based compound of formula (1) below as a cathode active material;
   a separator interposed between the anode and the cathode; and
   one of a liquid electrolyte and a polymer electrolyte:

    (1)

where $0.95 \leq x \leq 1.0$; $0 \leq y \leq 1$; M is at least one selected from the group consisting of Ni, Fe, Pb, Mg, Al, K, Na, Ca, Si, Ti, Sn, V, Ge, Ga, B, As, Zr, Mn, and Cr; and A is one selected from the group consisting of O, F, S, and P, the lithium-based compound of said formula (1) having, as measured by Raman spectroscopy, a ratio of peak intensities between spinel and hexagonal $A_{1g}$ vibrational modes in an approximate range of 1:0.1-1:0.4, a ratio of peak intensities between hexagonal $A_{1g}$ and $E_g$ vibrational modes in an approximate range of 1:0.9-1:3.5, and a ratio of peak intensities between spinel $A_{1g}$ and $F_{2g}$ vibrational modes in an approximate range of 1:0.2-1:0.4.

6. The lithium secondary battery of claim 5, wherein the cathode active material comprises 10-1000 ppm of nickel.

7. The lithium secondary battery of claim 5, wherein, as measured by Raman spectroscopy, the hexagonal $A_{1g}$ and $E_g$ vibrational modes of the lithium-based compound of said formula (1) have full-width at half-maximum (FWHM) values of approximately 12.8-13.6 and approximately 9.3-11.3, respectively.

8. The lithium secondary battery of claim 5, wherein, as measured by Raman spectroscopy, the spinel $A_{1g}$ and $F_{2g}$ vibrational modes of the lithium-based compound of said formula (1) have full-width at half-maximum (FWHM) values of approximately 12.2-13.0 and approximately 14.1-16.6, respectively.

\* \* \* \* \*